Aug. 28, 1962 J. M. BENNETT 3,051,612
SUBSTITUTE LEATHERS AND THE MANUFACTURE THEREOF
Filed June 15, 1953 11 Sheets-Sheet 1
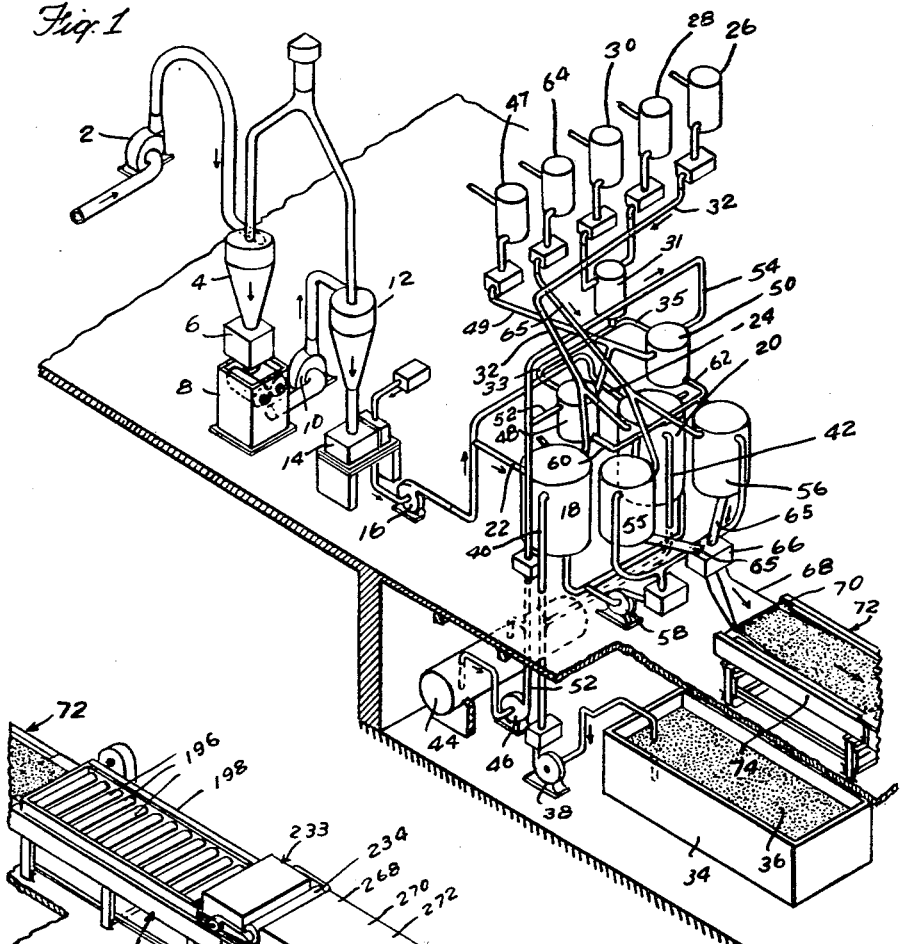
INVENTOR
JOHN M. BENNETT
BY Morris, Noble, Crews & Berry
ATTORNEYS

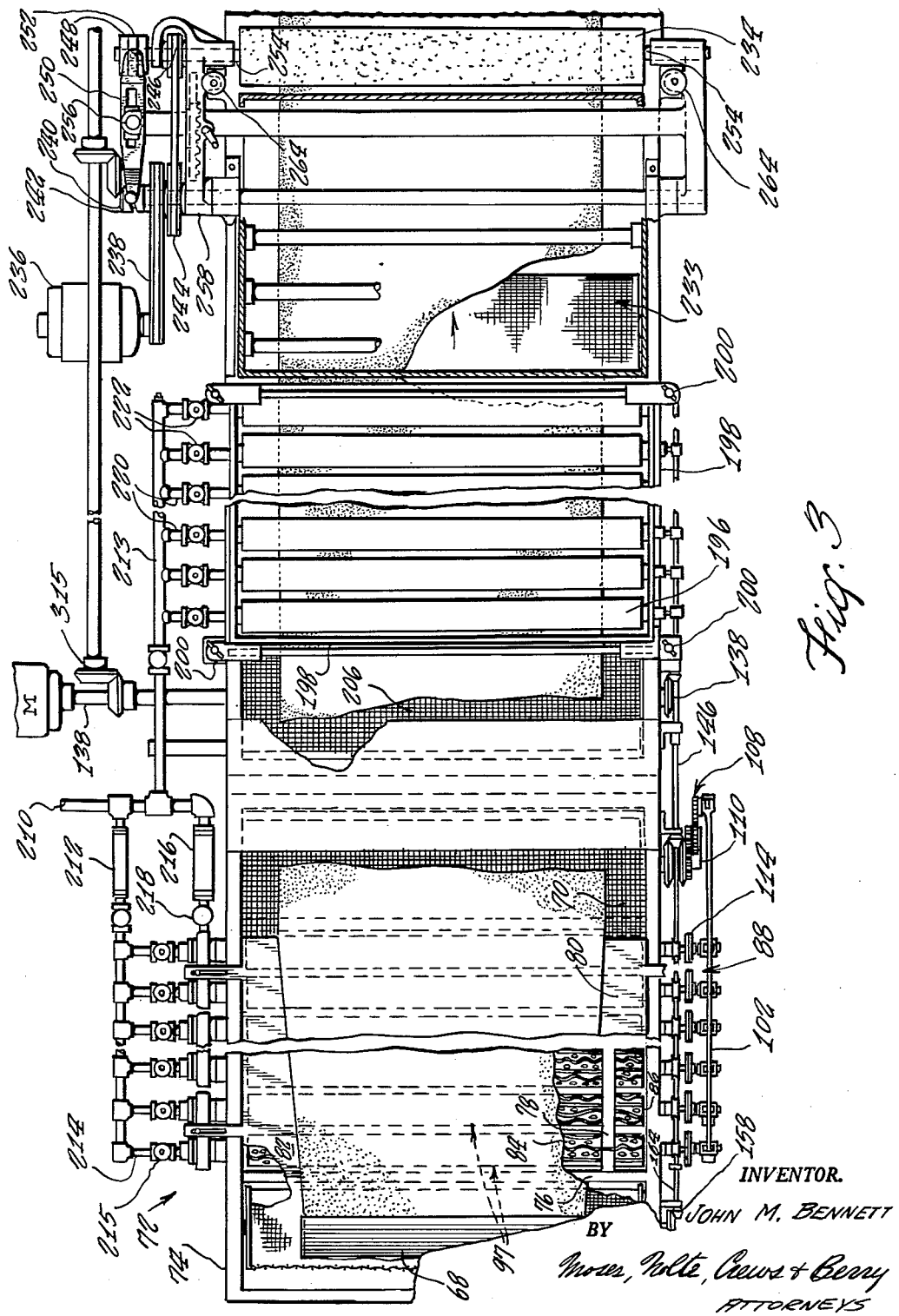

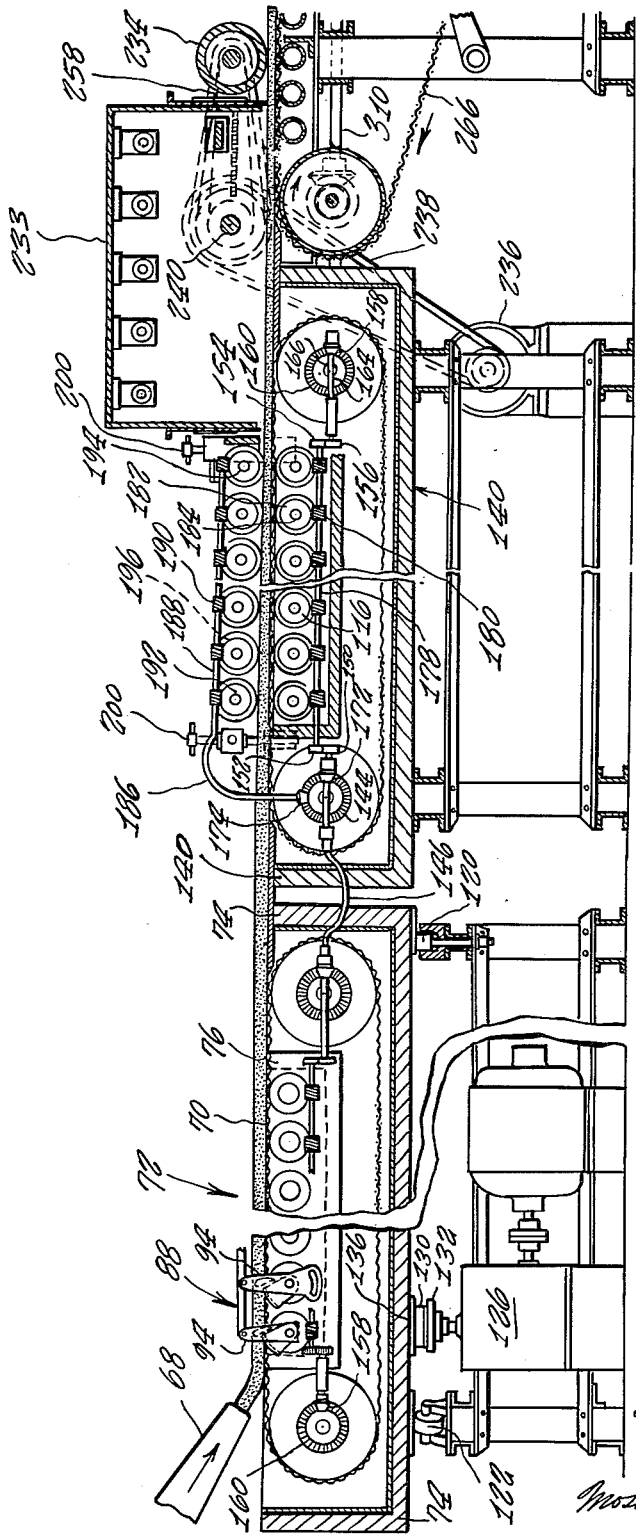

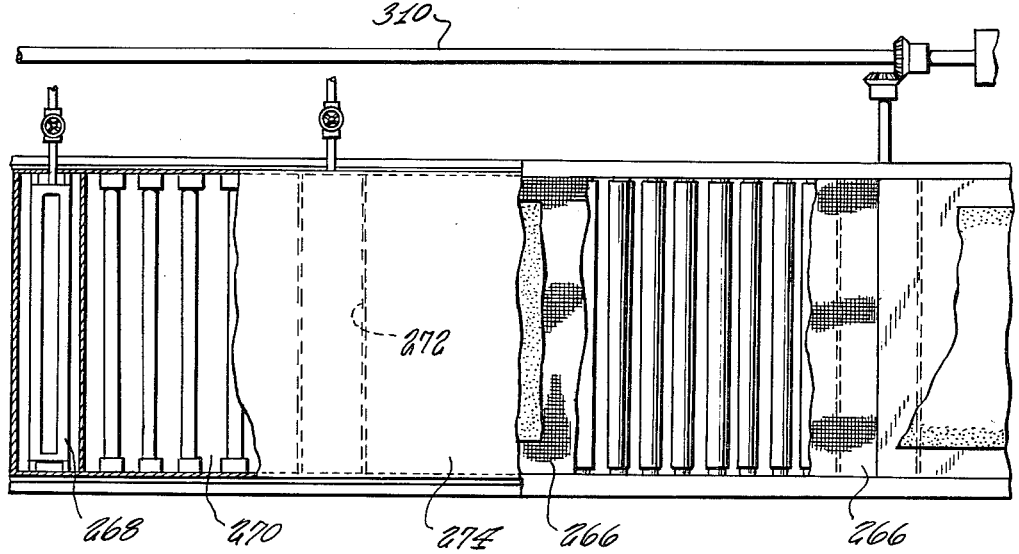
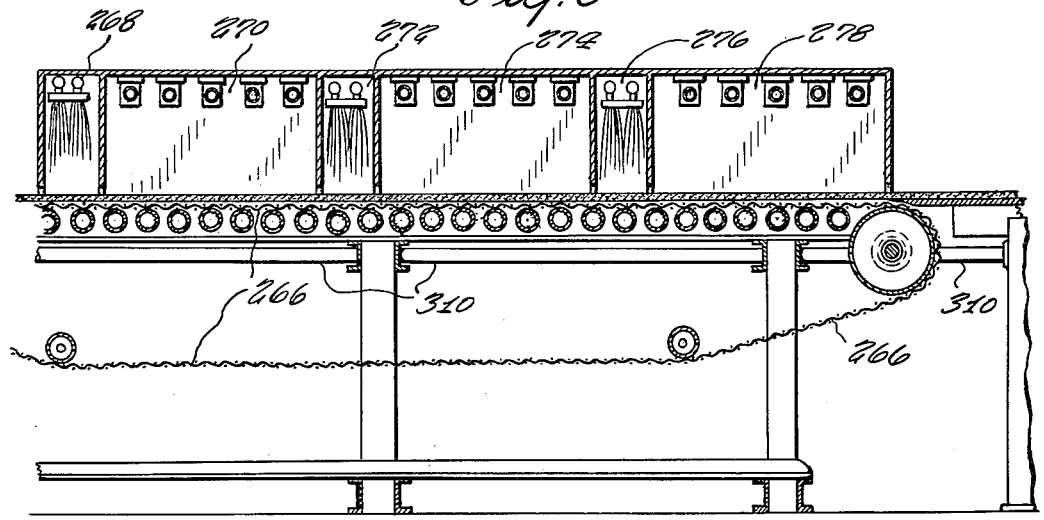
INVENTOR.
JOHN M. BENNETT

Aug. 28, 1962 J. M. BENNETT 3,051,612
SUBSTITUTE LEATHERS AND THE MANUFACTURE THEREOF
Filed June 15, 1953 11 Sheets-Sheet 5

INVENTOR.
JOHN M. BENNETT
BY
Moses, Nolte, Crews + Berry
ATTORNEYS

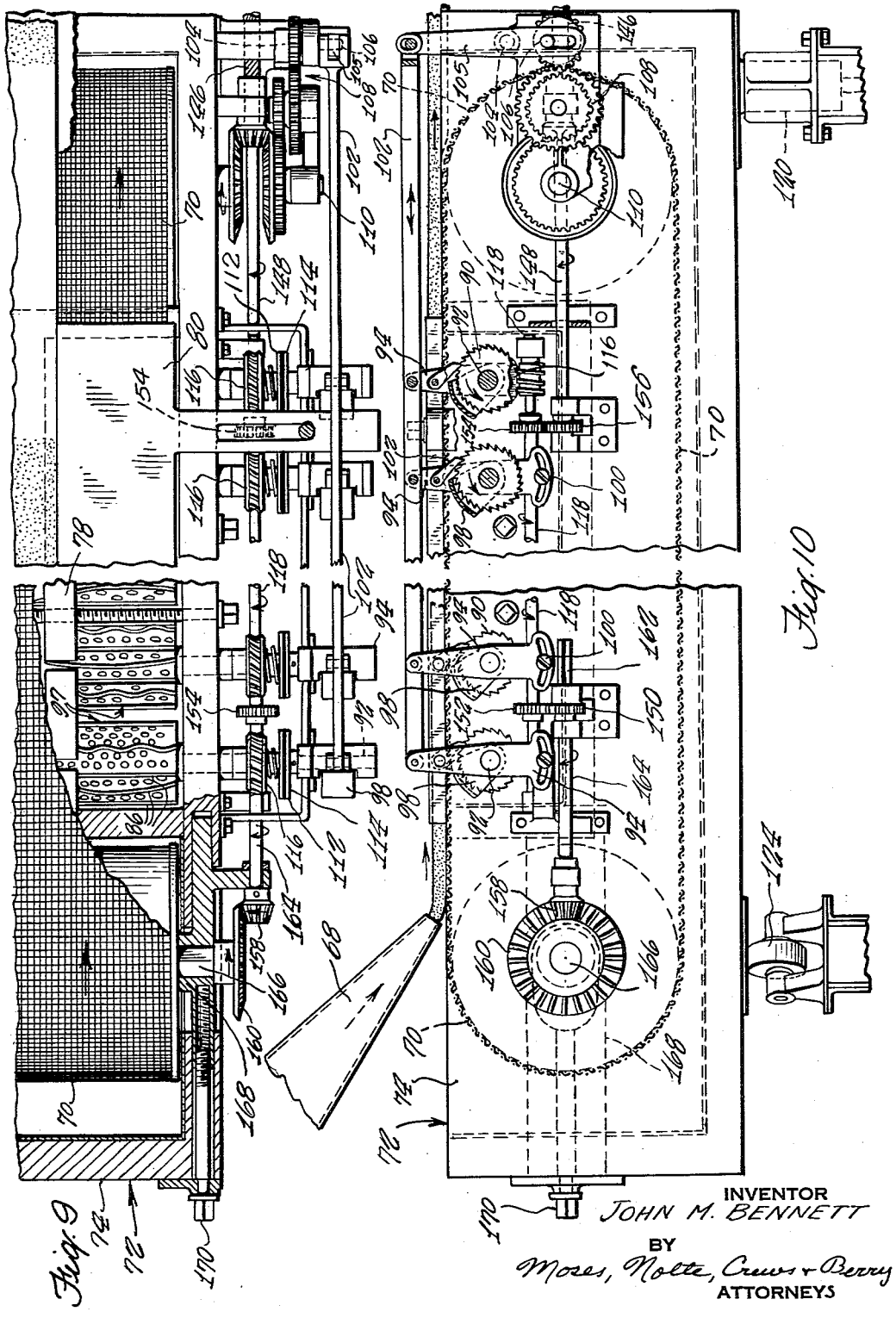

INVENTOR
JOHN M. BENNETT

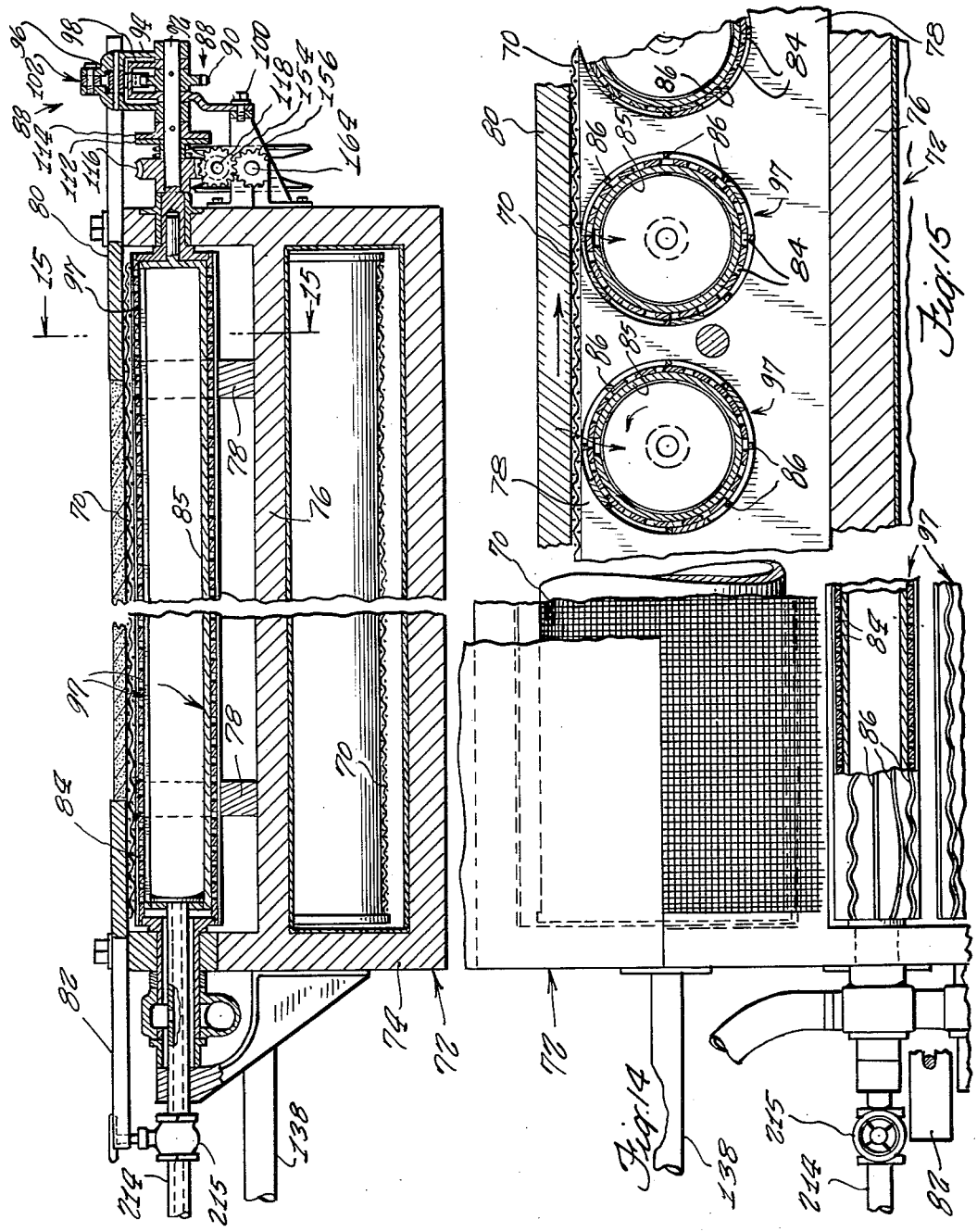

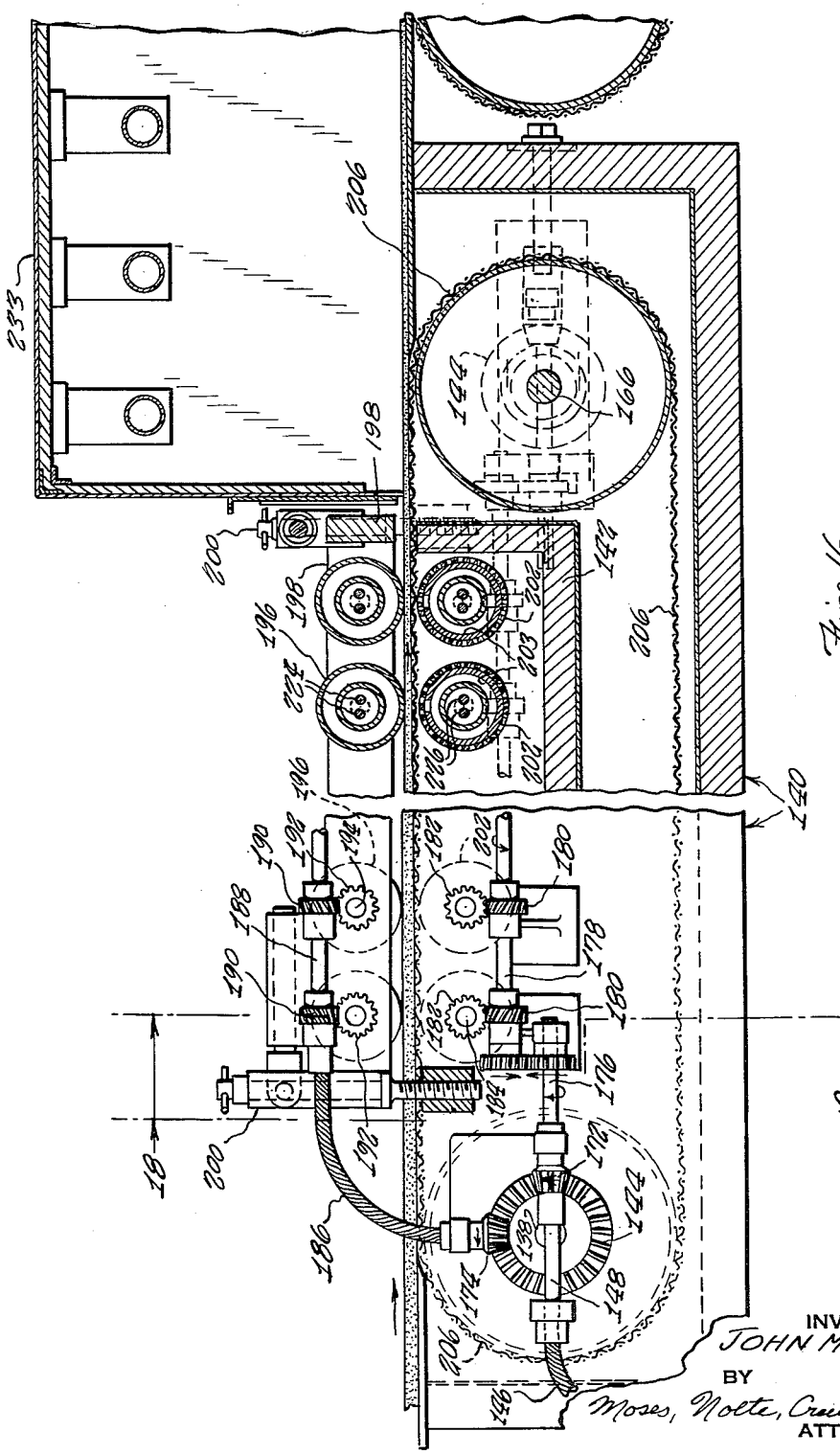

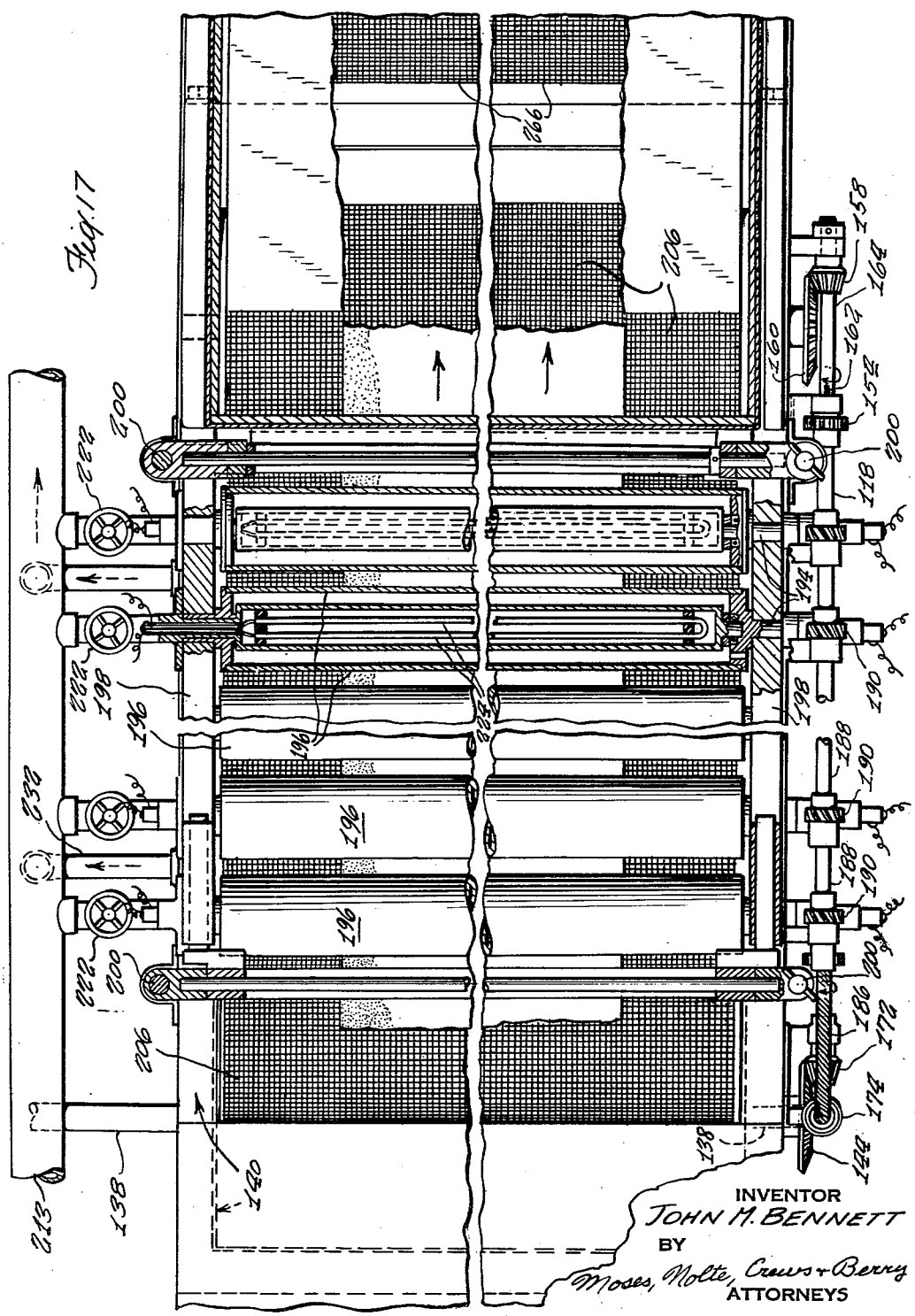

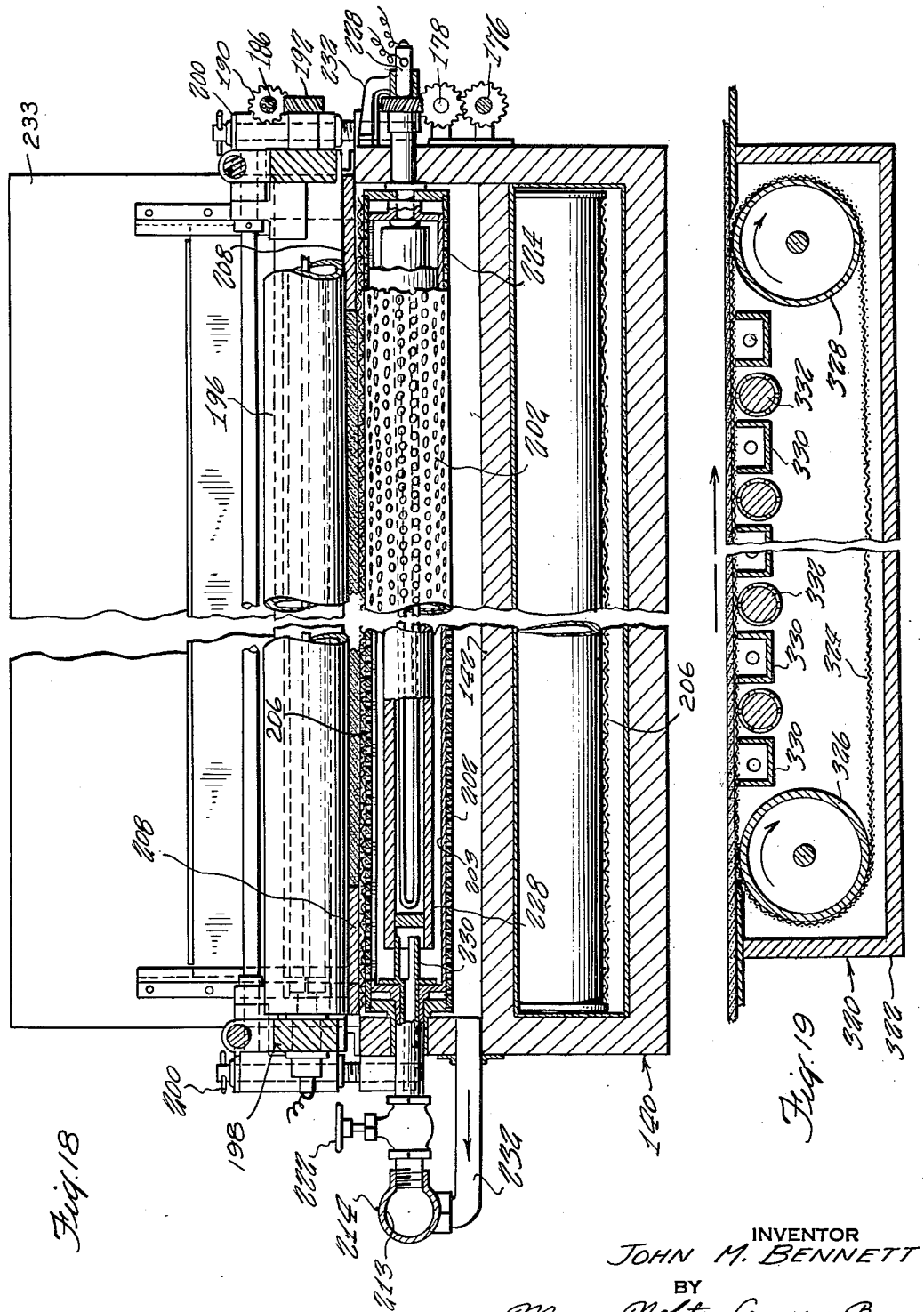

United States Patent Office 3,051,612
Patented Aug. 28, 1962

3,051,612
SUBSTITUTE LEATHERS AND THE MANU-
FACTURE THEREOF
John M. Bennett, New York, N.Y., assignor, by mesne
assignments, to Leather Industries, Inc., Dover, Del.,
a corporation of Delaware
Filed June 15, 1953, Ser. No. 361,674
19 Claims. (Cl. 162—151)

This invention relates to substitute leathers and the manufacture thereof. The primary object of the invention is to produce substitute leathers of high quality at low cost.

It is an object of the invention to provide sheet materials composed principally of rubber and of leather fibres, or of rubber together with leather fibres and a minor proportion of other fibres, which exceed natural sole leather in flexibility and resistance to abrasion, have high tensile strength though not as great as that of natural sole leather, and have substantial porosity though only a fraction of the porosity of natural sole leather. The fact that the porosity is less than that of natural leather is an advantage since the material though porous enough to "breathe" is substantially waterproof. The rubber serves as an adhesive coating agent, coating the leather fibres. Tensile strength is created by intertwining the latex coated fibres.

It is a further object to provide an economical and efficient method of producing sheet material of the kind referred to which will assure a uniformly high grade product and which can be carried out rapidly and without subjecting the fibres to conditions which are detrimental to them in any way.

To these ends it is a feature that to a water suspension of fibres a solution or suspension of rubber latex is added together with one or more coloring ingredients, a curing agent, and chemical means for coagulating the latex at room temperature to convert it into a gel. The gel is fed, desirably continuously, onto a sheet forming conveyor where it is shaken, kneaded, and subjected to progressively increasing suction to remove the water. The material is then subjected to heat and pressure and to still higher suction for removing more of the water, increasing the porosity, adjusting the density and evening the thickness. The material is next fed through a high frequency diathermic heater which heats the material rapidly and uniformly, driving off more moisture and quickly reducing the moisture content to about ten percent by weight of the total mass, at the same time causing the porosity of the material to be further increased. The material is then abraded as it is advanced to smooth the upper surface and adjust the material to uniform thickness, and it is then alternately lacquered and dried by radiant heat until as many coats of lacquer as are desired have been applied. The material is then pressed, the lacquered surface chilled, and, if desired, embossing is applied after which it is either cut into sheets or reeled.

The described process with or without optional variations is desirably carried out with the aid of suitable mechanism which is novel and which includes certain novel parts and sub-combinations of parts.

A first suction unit, which is provided for use in drying and sheeting the gel material, comprises a suction box, a screen wire conveyor and suction rollers in the suction box. Features of this unit include means for producing lateral oscillation of the suction box of wide amplitude at the introductory end of the unit and of diminishing amplitude toward the delivery end; the construction of the suction rollers to serve also as screed rollers for kneading the material through the wire screen guiding the direction of the fibres so that they interlace; the provision of higher suction by each roller than that exerted by the roller which precedes it; and the provision of drive mechanism for the combined suction and screed rollers which causes them to run alternately forward and backward with respect to the direction of the material feed, but chiefly in a backward direction.

A second suction unit is provided which includes lower suction rollers and opposed upper heated rollers, the suction being progressively increased from the introductory end to the delivery end of the unit as in the first unit, but the suction of the second unit being higher throughout. The upper and lower rollers are driven at the same rotary speed but the rollers of both sets are of progressively increasing diameter from the first to the last. Thus an increased pressure is exerted and the surface speed of the rollers is slightly increased. Provision is made for adjusting the upper rollers relative to the lower rollers in accordance with the thickness and the desired density of the material. The suction and heat further dry the material, while the pressure adjusts the density and the varied linear speed of the upper rollers promotes the evening out of the upper surface of the sheet material.

The units for sheeting and partially drying the material are followed by a high frequency diathermic heater which heats the sheet quickly and uniformly throughout its thickness. This further dries the material and in driving out the moisture from the interior increases the porosity.

An abrading roller follows the high frequency heater. This roller is driven rotatively and is reciprocated axially to assure the production of a smooth plane upper surface.

Lacquering and drying mechanism follows the abrader, this mechanism comprising several spray units and infrared driers arranged in alternation to produce as many coats as may be desired. The coated sheet is next passed through smoothing rollers, chilling rollers, and, if desired, embossing rollers. After that it is either cut into sheets or reeled.

Other objects and advantages will hereinafter appear.

In the drawing forming part of this specification,

FIGURES 1 and 2 are complementary diagrammatic perspective views comprehensively illustrative of the process and of mechanism used in carrying out the process;

FIGURES 3, 5 and 7 are complementary plan views of the mechanism for receiving the material in gel form and for carrying the process through to completion;

FIGURES 4, 6 and 8 are complementary views in sectional elevation corresponding respectively to FIGURES 3, 5 and 7;

FIGURE 9 is a fragmentary plan view, partly in section, of the first suction unit;

FIGURE 10 is a fragmentary view in elevation of the structure shown in FIGURE 9;

FIGURE 13 is a fragmentary transverse sectional view taken through the first suction unit;

FIGURE 14 is a fragmentary plan view showing a portion of the structure of FIGURE 13;

FIGURE 15 is a sectional view taken upon the line 15—15 of FIGURE 14, looking in the direction of the arrows;

FIGURE 16 is a fragmenatry longitudinal vertical sectional view showing the second suction unit and parts of the diathermic heater;

FIGURE 17 is a fragmentary plan view, partly in section, of the second suction unit;

FIGURE 18 is a view in vertical transverse section of the second suction unit, the structure being broken away intermediate its ends for compactness of illustration; and FIGURE 19 is a view in longitudinal vertical section of an auxiliary suction and screeding unit which may optionally be used in advance of the suction unit of FIGURES 3, 4, and 9 to 15.

Figure 11:
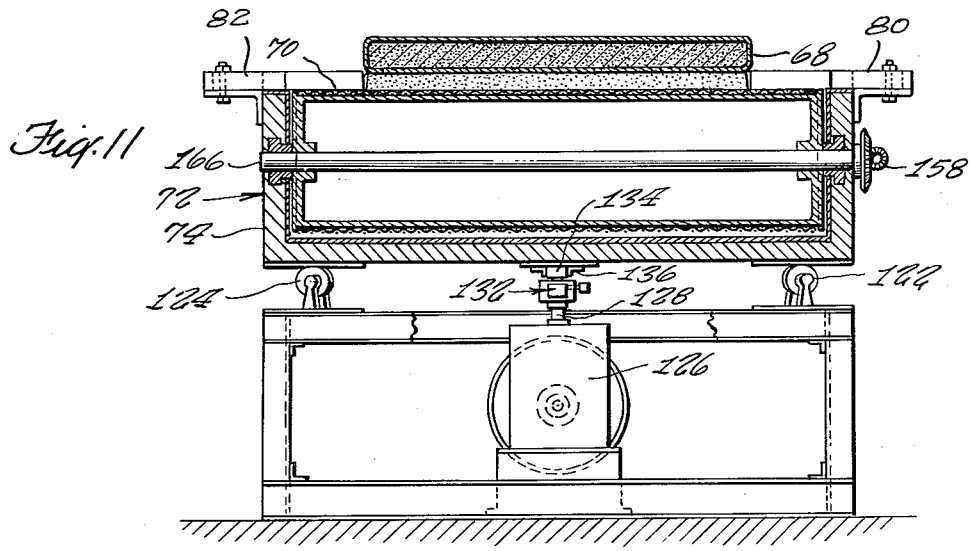
FIGURE 11 is a view in end elevation, partly in section, of the first suction unit and a supporting structure therefor.
Figure 12:
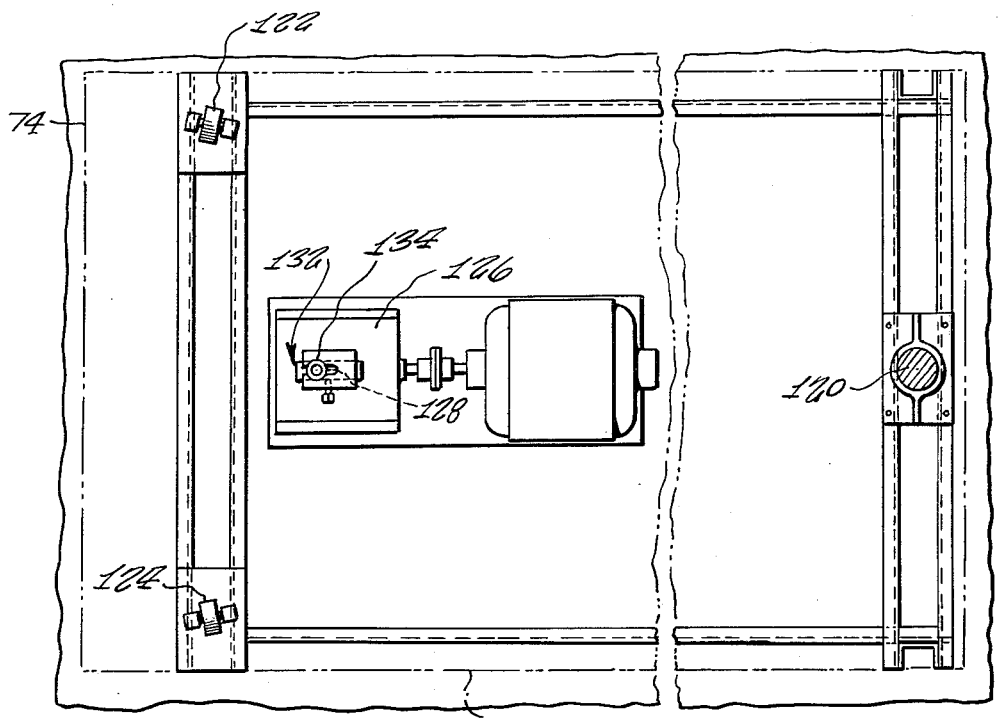
FIGURE 12 is a plan view of the supporting structure for the first suction unit together with driving mechanism mounted therein.

In carrying out the novel process, dry material, which consists of waste leather fibres having all the original tannages intact therein, is sucked up from any suitable source of supply by a blower 2, which delivers it to a Cyclone separator 4 for removing foreign matter. The material not rejected is dropped into a measuring device 6 and delivered to a grinding and shifting unit 8. The sifting screen eliminates the kernels and the dust in the leather, passing them but not passing the fibres. From the grinding and sifting unit a blower 10 delivers the ground and sifted fibrous material to a Cyclone separator 12 which further refines the material. The material passes thence into a measuring device 14 where it is mixed with a supply of water, to be conveyed by means of a pump 16 which delivers it alternately to two five-hundred gallon tanks 18 and 20. The delivery is controlled by valves (not shown) in pipe lines 22 and 24. Lines 22 and 24 deliver measured amounts of fibre suspension to the tanks 18 and 20, respectively.

A tank 26 contains colored dye which is caused to flow in measured amounts through a branched pipe 32 directly into the tanks 18 and 20. Valves (not shown) in the branches of pipe 32 control the dispersion of the dye.

A tank 34 contains a water suspension 36 of other waste fibres, such as cotton, rayon, nylon, cellulose and various other materials or a mixture of them, such fibres being present in known concentration and, if mixed, in known relation to one another as well as to the water. A centrifugal pump 38 delivers the fibre suspension 36, if used, in measured amounts to the tanks 18 and 20, as desired, by means of conduits 40 and 42.

A latex tank 44 supplies a latex solution by means of a pump 46 in measured amounts to tanks 48 and 50 by means of pipes 52 and 54. Tanks 28 and 30 contain respectively a curing agent and an anti-discoloration agent which is added thereto for opposing discoloration of the latex by the curing agent. These ingredients are fed through measuring devices to a tank 31 and passed thence through branched conduits 33 and 35 to the latex tanks 48 and 50, the delivery of these materials as before being controlled by valves which are not shown. A solution or slurry of titanium dioxide for whitening is supplied from a tank 47 through a measuring device and a branched pipe 49 to the latex tanks 48 and 50.

The latex solution with the added ingredients is fed from the respective tanks 48 and 50 to the master tanks 18 and 20 respectively through conduits 60 and 62. A tank 64 supplies an alum $(AlNH_4(SO_4)_2)$ solution through a measuring device and a branched conduit 65 to master tanks 55 and 56. The mixtures contained in the tanks 18 and 20 are also delivered respectively to the master tanks 55 and 56.

The mechanism which has been described comprises two parallel series of tanks, the first comprising tanks 48, 18 and 55 and the second comprising tanks 50, 20 and 56. These two series of tanks are used in alternation, one train being used to prepare and supply material to the master tank 55 and the other to supply it to the master tank 56. While a batch of material is being fed from the tank 55 another batch is being prepared in the other series of tanks, and vice versa. Either tank is connected to deliver the material in gel form through a flow regulating box 66 and a distributing nozzle 68 onto the first unit 72 in which the water extracting and sheeting operation begins. The thickness of the material is substantially controlled by the rate of delivery of the gel through the nozzle 68 in relation to the rate at which the delivered gel is carried away from the nozzle.

The following constitutes an illustration of ingredients and procedures which have been found to produce substantially optimum results for one product. For each square yard of finished material of about one-eighth inch thickness the ingredients are as follows:

A leather fibre suspension consisting of six pounds of leather fibres in forty-eight pounds of water.

A latex solution comprising three pounds of solids and two and eight-tenths pounds of water.

A curing agent (A) whose composition is given below in the quantity of two and four-tenths ounces of solids and thirty-four and four-tenths ounces of water.

An anti-discoloration agent (B), for preventing darkening of the product by the precipitated latex, whose composition is given below in the quantity of one-tenth pound.

A coagulant consisting of an alum solution comprising twelve ounces of alum and the necessary water to dissolve it.

A whitener (C) constituted by a titanium dioxide and water mixture, composed of one and one-half pounds of solids in one and one-half pounds of water.

A dye composed of three-fourths ounce solids in one pound of water.

The water referred to above includes water in which the ingredients are supplied and any tap water added to make up the specified proportions. The tap water is controlled in temperature being supplied in the range 70° to 75° F.

For curing agent a vulcanizing dispersion and fast curing agent is desirably employed of the following composition:

|  | Parts |
|---|---|
| Zinc oxide | 2. |
| Sulphur | .6 |
| Agerite white | 1. |
| Ethyl zimate red (zinc diethyl dithio carbamate) | 1. |
| Latex Telloy | .5 |
| Darvan No. 1 | .2 |
| Casein | .15 |
| Caustic soda | .1 |
| Water | 4.65 |
| Total | 10.20 |

Latex Telloy is composed of ninety-eight percent powdered tellurium, the remaining two percent being essentially powdered selenium.

Darvan No. 1 is a polymerized sodium salt of alkyl naphthalene sulphonic acid.

The anti-discoloration agent referred to above consists of hydro-quinone and mono-benzyl ether in equal parts by weight. It is not intended to affect the whitener but is intended to prevent darkening of the product by the precipitated latex. The relative weights may be varied from one to two to two to one.

A preferred procedure is as follows:

A fibre-water mixture having been prepared in one of the fibre-water tanks 18, 20, the dye is delivered to the fibre-water tank. The mixture is then delivered to one of the master tanks 55, 56 in the prescribed quantity.

The curing agent from the tank 28 and the anti-discoloration agent from the tank 30, in the quantities specified, are united in tank 31 and are stirred together for about one minute. They are then delivered slowly into one of the latex tanks 48 or 50 and stirred for about three minutes. The titanium dioxide and water mixture in the quantity specified is added to the mix in the latex tank 48 or 50. The latex solution with these added ingredients is then delivered into the master tank containing leather, water and dye and stirred in for two to three minutes. The alum is then added directly to the master tank and stirred in for a quarter of a minute after which the delivery of the material through the nozzle 68 is begun. As one batch is nearing exhaustion the second batch from the alternate tank series is turned on, so there will be no break in the continuity of the sheeted product.

It is an important point that the entire process is carried out at moderate temperatures which retain the live characteristics of the rubber and the fibres. The latex and fibres, together with the other compatible ingredients, are combined in a matter of minutes and at a very moderate temperature, preferably between 70° and 75° F., hereinafter referred to as room temperature. In the subsequent mechanical treatment, to be described, the temperature of the material is never caused to go above 150° F., even where heat and pressure are applied. Retention of live characteristics through limitation of temperature contributes importantly to the resiliency and longevity of the product. In particular, fibres of leather and synthetic fibres would be seriously impaired by any substantial exposure to higher temperatures.

With the ingredients specified above a sheeted material with the fibres coated, thoroughly matted and intertwined and adhered to one another may be produced having the following physical properties:

An appearance closely resembling natural leather;
An abrasion resistance approximately twice that of natural sole leather;
A flexibility exceeding that of natural sole leather;
A stitch-tear or tensile strength two-thirds or more than two-thirds that of natural sole leather;
A porosity about one-tenth to one-eighth that of natural sole leather, the water resistance being much higher than that of natural sole leather.

While the ratios of ingredients given above have been found to work out very satisfactorily, it is not essential that they be adhered to closely since considerable variation has been found to yield practical and advantageous results. Variation is desirable, moreover, for producing leathers of different properties.

Assuming the solid latex content to be unvaried, the curing agent instead of being in the ratio of one to twenty as given may be as high as one to fifteen or as low as one to twenty-five.

The anti-discoloration agent in relation to the curing agent, instead of being in the ratio of one to three, could be as high as one to two or as low as one to four.

The whitener, which desirably consists of equal parts by weight of water and titanium dioxide, can include from one-half pound to one and one-half pounds of the latter ingredient.

The alum instead of bearing a ratio of one to four to the latex could be as high as one to three or as low as one to six. A considerable part of the alum is eliminated with the water and does not form a part of the final product.

The leather may constitute as much as seventy-five percent of the solids contained in the final composition and the latex as little as fifteen percent, and these proportions may be varied all the way to an opposite extreme in which the leather constitutes sixty percent and the latex thirty percent. As a rule the leather and rubber constitute from eighty-eight to ninety-two percent of the total product. The ratio of water to total solids in the starting ingredients may be increased as much as fifty percent above the figures given in the specific example or decreased twenty-five percent below those figures.

Other fibres, when employed, are employed in addition to, and not in lieu of, the leather fibres. The proportions may be varied according to the properties desired. For increased hardness and stiffness nylon fibres are added; for increased tensile strength long fibre cotton is preferred. The fibres other than leather may be included up to four ounces per square yard.

The product can be made by the described process in any desired thicknesss and may be used with advantage and economy for any of the myriad uses to which natural leather is put.

When the mix is ready in either one or the other of the master tanks 55 and 56 a valve (not shown) in branch pipe 65 delivers the mix to a flow regulating device 66. The device 66 regulates the flow rate of the material being discharged. The material is discharged through a broad discharge nozzle 68 which delivers the material to a screen conveyor 70 which is part of a suction unit 72.

The machine 72 comprises a rectangular box 74 which contains a smaller suction box 76 over which the screen 70 travels in the direction away from the nozzle 68. The suction box is provided with screed rollers 97 which are located below the upper or active stretch of screen 70 and support the active stretch of the screen. The screed rollers are provided at their ends with adjustable sealing walls 78 through which the rollers pass. These sealing walls 78 cooperate with deckle plates 80 and 82 which seal off the active part of the suction box 76. The screed rollers 97 are provided with suction perforations 84 and the inactive holes are sealed off for greater suction efficiency by means of an internal sleeve 85. The screed rollers are also provided with screeding ribs 86 which act against the underside of the screen 70 chiefly in a counter-clockwise direction, or against the travel of the screen. The ribs on the screed rolls are of inward and outward convolvulous shape, as shown, giving a directional kneading action and causing the fibres to interlace instead of running parallel.

The counter-clockwise rotation is controlled by ratchet mechanism generally indicated at 88. Such mechanism comprises a ratchet 90 secured to the screed roller shaft 92 (see FIGURES 9, 10 and 13). Also pivoted on each screed roller shaft 92 is an arm 94 carrying a pawl 96 for cooperating with ratchet 90. A shield 98 pivoted on screed roller shaft 92 is adjustably controlled by a bolt 100. The adjustment of this shield permits the pawl to feed the ratchet one or more tooth spaces at a stroke. When engaged with the ratchet 90, the pawl 96 turns the screed roller 97 in a clockwise direction. This movement is accomplished by a rod 102, the right hand end of which is connected to a lever 105. The lever 105 is pivoted at 104 and actuated by an eccentric pin 106 (see FIGURE 10). This part of the mechanism is driven through a train of gears, generally indicated at 108, from the screen driving shaft 110. Means is provided also for driving the screed roller shafts backward. This comprises a friction clutch 112 mounted on each screed roller shaft 92 and spring-pressed against a cooperating disc 114 fast upon the shaft. Also mounted on each screed roller shaft 92 is a wormwheel 116 which rotates loosely on the shaft 92. The clutch member 112 has a keyed connection with the worm wheel 116. These elements provide the yielding drive connection which enables the screed roller shaft 92 to be rotated, at times, in the opposite direction from the worm wheel 116. The worm wheel 116, driven constantly from a worm shaft 118, seeks to drive screed roller shaft 92 always in a counterclockwise direction. The slip clutch, by slipping, enables the pawl to drive the shaft 92 in the opposite direction, or clockwise. The screed rollers are driven principally in a backward direction relative to the material feed by the worm wheels 116, but are intermittently driven in the opposite direction by the pawls 96. A thorough kneading action is thus applied to the material through the screed roll ribs.

The unit 72, comprising the box 74, is supported at three points. At one point, near the front end, a vertical pivotal support 120 is provided. At the other two points near opposite sides of the rear end supporting rollers 122 and 124 are provided. A unit oscillating drive is provided, comprising a gear reduction box 126, which drives a vertical shaft 128, on which is mounted an adjustable eccentric 132. This eccentric is provided with a roller 134 which engages a slotted member 136 secured to the underside of the suction box 74. The described drive gives the suction box a lateral "shake." The location of the eccentric in relation to the pivot 120 brings about the maximum "shake" at the point where the material is received from the nozzle 68 so that by the time the material reaches the delivery end of the suction box 74 a minimum or nearly zero "shake" is reached.

A main drive shaft 138 passes through a second suction box 140, which suction box is constructed similarly to the one previously described in that it is provided with another suction box 142 which is generally the same as the box 76 in the unit 72. The second suction unit, however, does not have screeding rollers or "shake," and it does include additional rollers for engaging the top of the work material.

The drive shaft 138 (see FIGURES 16 and 17) is provided on the outside of the suction box 140 with a bevel gear 144, from which bevel gear the operating parts of the unit 72 and of the fixed suction box unit 140 are driven. In view of the fact that the unit 72 is oscillated, a flexible drive shaft 146 is provided.

A shaft 148, which is a continuation of the flexible drive shaft 146, is provided with a spur gear 150 which, in turn, engages a gear 152 mounted on the worm shaft 118. This shaft runs horizontally below worm wheels 116. On the other end of the worm shaft 118 are spur gears 154 and 156 which are similar to the above-mentioned spur gears 150 and 152. They provide the drive for the screen 70 through bevel gears 158 and 160. As the screen requires adjustment a yielding connection is provided for the spur gear 156, which takes the form of a keyway 162 in a shaft 164, to which is secured the bevel gear 158. The shaft 166, to which is secured the bevel gear 160, passes through a bearing block 168 which is adjustable and slides in the suction box 74. Adjusting screw 170 is used to fix the adjustment of the bearing block 168. The bearing block 168 is constructed to prevent any leakage of water from the suction box 74.

The bevel gear 144 drives a bevel gear 172 and also a bevel gear 174. The gear 172 is secured to a shaft 176 which drives, by means of spur gears, a counter shaft 178 on which are mounted a series of spiral gears 180 which engage spiral gears 182 mounted on roller shafts 184. Bevel gear 174 is secured to a flexible drive shaft 186. This shaft 186 drives a shaft 188 on which are mounted a series of spiral gears 190, which drive spiral gears 192 mounted on roller shafts 194. The shafts 194 have upper pressure rollers 196 fast upon them. These rollers turn counter-clockwise and are rotatably mounted in a rectangular frame 198 which is supported on vertically adjustable screws 200. Adjustment of the frame raises or lowers the rollers 196 to accommodate the different thicknesses of material desired, and to control the density of the material.

On shafts 184 are mounted lower combined pressure and suction rollers 202 which turn clockwise. The rollers 202 are provided with suction holes which are controlled by a sleeve 203, similar to the sleeves in the rollers 97. These rollers are located below the screen 206 and co-operate through the screen with the upper rollers 196. The pairs of opposed rollers are of progressively increased diameters from the introductory pair to the discharge pair. All are driven at the same rotary speed, so that the peripheral speed of each pair is greater than that of the preceding pair. The rollers of each pair stand a little closer together than the rollers of the preceding pair in order to apply progressively increasing pressure to the material, the pressures desirably being progressively increased from fifty pounds per square inch at the first rollers to four hundred pounds per square inch at the last rollers. The rollers tend to even the thickness of the material, to smooth the upper surface, and to adjust the density.

Deckle plates 208 limit spreading of the material, confining it to the suction area encompassed by suction box 142. The suction is relied upon not only to extract the water from the material but also to draw the fibres of the material uniformly into a closer bond and to create porosity. The suction used here is very much greater than that employed in paper making, especially in the second suction box.

The suction is equivalent to twenty-two inches of mercury in the second suction box at the discharge end. The suction increases from the beginning to the end of the first suction box and again from the beginning to the end of the second suction box. For example, in the first suction box a suction increasing from ten inches to eighteen inches of mercury, depending on the material, may be applied—in the second box a suction increasing from fifteen inches to twenty-five inches, depending on the material, may be applied. It is important to regulate the suction in accordance with the work.

The removal of the water depends upon the joint effect of three factors:
(1) the alum which promotes the coagulation of the rubber and its separation from the water,
(2) the screeding which works the material, bringing the coated fibres together and mechanically separating them from the greater portion of the water, and
(3) the suction which withdraws the water from the felted mass of solids.

The screed rollers assist also in the matting or felting of the latex coated fibres, causing the fibres to be disposed and interlaced in all directions.

A main pipe line 210 (FIGURE 5) with branch pipe lines 212 and 213 provide vacuum for the suction rollers of suction box 76, and for the suction box 142 and the suction rollers within it. Branch line 212 is provided with a series of pipe connections 214 which are provided with valves 215 and control the vacuum to rollers 97. An additional branch line 216 also provides suction to the above-mentioned rollers 97. This latter line is controlled by a valve 218 which may be shut off completely, in which case the control valves in pipe lines 214 control the suction to the individual rollers 97. The valves are turned different amounts to regulate the amounts of suction applied to the individual rollers 97.

Branch pipe line 213, which provides vacuum to the rollers 202 (see FIGURES 3 and 17), is provided with branch pipe lines 220 which are controlled by regulating valves 222 and therefore regulate the vacuum in the individual rollers 202. Pipe line 214 is also provided with a branch line 232 to provide suction directly to the box 142.

Rollers 196 and 202 are further provided with electrical heating units 224 and 226. These units tend to rotate but are held in fixed position by means of an extension 228 held by a bracket 230.

After leaving the last pressure rollers the material passes through a high frequency diathermic heating unit 233 which causes the sheet material to be heated uniformly throughout its thickness within a few seconds and reduces it to the required dry state preparatory to finishing. The finishing includes abrading, and may include coating and embossing. Upon leaving the diathermic heater the moisture content of the material is about ten percent.

From the diathermic heater the material goes to an abrading roller 234 which is driven by a motor 236 (FIGURES 3 and 4). The motor is provided with belt drive 238 which drives a shaft 240, to which is secured a cam 242 and also a pulley 244. Pulley 244 drives the abrader pulley 246, on whose shaft is also made fast a grooved collar 248. A pivotal arm 250 is connected by means of a yoke to a collar 252 which embraces the collar 248. The cam 242 operates one end of the lever 250, imparting an axial oscillatory motion to the abrader shaft 254.

To change the oscillatory motion of the abrading roller a rack and pinion adjustment is provided which moves the pivot 256 to and from the cam 242. Arms 258 and 260 are pivotally mounted on the shaft 240 and are adjustably mounted to accommodate different thicknesses of material. The adjusting means comprises hand-adjusting screws 264 which raise or lower the abrading roller 234.

A roller screen 266 carries the material successively through the latter part of the diathermic heater, a spray chamber 268, a drying chamber 270, a spray chamber 272, a drying chamber 274, a spray chamber 276, and a final drying chamber 278. The driers employ infra-red electric lamps for drying the stain or lacquer used for the purpose of surface finishing the material in various desired finishes and colors.

The material is then driven through a pair of heated smoothing rollers 280 and thence through a pair of chilling rollers 282 to which a cooling fluid such as water is supplied. From there the material goes through one or more pairs of engraved embossing rollers 284. The rollers 280, 282 and 284 are provided with means whereby they can be raised out of working contact with the material. This is accomplished by utilizing vertically movable bearings 281, springs 283 which press the bearings upward, and screws 285 which are adjustable, and which bear downward against the bearings.

After the material leaves the last embossing roller 284 it comes to a measuring device, generally indicated at 286, and thence passes rotary slitting cutter discs 288 which trim the marginal edges of the material to the required width.

After the trimming takes place the material reaches a transverse cutter 290. The transverse cutter comprises a lower bed roller 292 which is provided with a smooth cylindrical surface. The roller 292 cooperates with a transverse knife edge 291 which is mounted on an upper roller 293. These rollers are shown geared together, but the lower one 290 may be an idler so as to cause it to present different surface portions for cutting as it rotates. The cutter 290 is provided with a one-revolution clutch, generally indicated at 294, which is controlled by a lever 296. The lever 296 is provided with a lower extension 298, which cooperates with a latch 300 for breaking the driving relationship between the driving means and the knife carrying roller 293.

The cutter may be held inactive, if desired. In that case, after the material passes the cutter it runs over an idler roller 302 and thence onto a take-up wooden core 304.

For interposition between the convolutions of the material as it is being wound up onto core 304, a separation web 305 is provided as a protective means for the coated surface. This material is simply drawn in from a reel 311 by the work material as it is wound. The reel 311 is retarded by a weighted brake strap 313.

A positive clutch 306 is provided for driving the takeup core 304 which may be rendered active or inactive as desired. A friction slip drive 308 is also provided in the drive train to the takeup core 304. The positive clutch 306 is responsive to a control lever 307, provided with a finger 309, which serves to break or to establish the driving connection between the drive shaft 310 and a shaft 312 by means of a latch 313. This stops the slip drive, thereby stopping the core 304.

All the driving members from the screen 266 to the right hand end of the machine except the abrader are appropriately driven from motor M through shaft 138, bevel gears 315 and 316 and shaft 310.

In FIGURE 19 disclosure is made of a further suction unit 320 which may optionally be used in advance of the unit 72. The unit 320 comprises a box 322 within which a conveyor screen 324 is mounted to run on drums 326 and 328, the latter of which is driven. The screen 324 runs over suction boxes 330 and ribbed screed rollers 332 which are arranged in alternation, as shown. In this instance the screed rollers are not suction rollers. They are desirably driven backward with reference to the direction of material feed, or the drive may be like that described for the rollers of unit 72. The suction boxes 330 apply progressively higher suction from the first to the last, the control being as described for the rollers of unit 72. The suction may vary between ten inches of mercury and fifteen inches of mercury.

I have described what I believe to be the best embodiment of my invention. I do not wish, however, to be confined to the embodiment shown, but what I desire to cover by Letters Patent is set forth in the appended claims.

What I claim is:

1. In a method of making a sheeted leather substitute material, the procedure which comprises preparing a fibre-water mixture in which at least ninety-six percent of the fibre content consists of leather fibres, mixing therewith a latex solution in such relative quantities that the ratio of solid rubber to leather fibre lies within the range of fifteen to seventy-five on the one hand and thirty to sixty on the other to form a composite mixture, coagulating the latex, delivering the resultant composition in gel form in a broad flat stream, conveying said stream away from the point of delivery, and during such conveyance subjecting the material to lateral oscillation of diminishing amplitude, simultaneously kneading the material and subjecting it to progressively increased suction to effect a partial separation of the water, then while further subjecting the material to progressively increasing suction applying surface heat and at the same time applying progressively increasing smoothing and condensing pressure.

2. In a method of making a sheeted leather substitute material, the procedure which comprises preparing a fibre-water mixture in which at least ninety-six percent of the fibre content consists of leather fibres, mixing therewith a latex solution in such relative quantities that the ratio of solid rubber to leather fibre lies within the range of fifteen to seventy-five on the one hand and thirty to sixty on the other to form a composite mixture, coagulating the latex, delivering the resultant composition in gel form in a broad flat stream, conveying said stream away from the point of delivery, and during such conveyance subjecting the material to lateral oscillation of diminishing amplitude, simultaneously kneading the material and subjecting it to progressively increased suction to effect a partial separation of the water, then while further subjecting the material to progressively increasing suction applying surface heat and at the same time applying progressively increasing smoothing and condensing pressure, and then applying diathermic heat further to effect drying.

3. In a method of making a sheeted leather substitute material, the procedure which comprises preparing a fibre-water mixture in which at least ninety-six percent of the fibre content consists of leather fibres, mixing therewith a latex solution in such relative quantities that the ratio of solid rubber to leather fibre lies within the range of fifteen to seventy-five on the one hand and thirty to sixty on the other to form a composite mixture, coagulating the latex, delivering the resultant composition in gel form in a broad flat stream, conveying said stream away from the point of delivery, and during such conveyance subjecting the material to lateral oscillation of diminishing amplitude, simultaneously kneading the material and subjecting it to progressively increased suction to effect a partial separation of the water, then while further subjecting the material to progressively increasing suction applying surface heat and at the same time applying progressively increasing smoothing and condensing pressure, and then applying diathermic heat further to effect drying, all while limiting the material to a temperature not in excess of 150° F.

4. In a method of making a sheeted leather substitute material, the procedure which comprises preparing a fibre-water mixture in which at least ninety-six percent of the fibre content consists of leather fibres, mixing therewith a latex solution in such relative quantities that the ratio of solid rubber to leather fibre lies within the range of fifteen to seventy-five on the one hand and thirty to sixty on the other to form a composite mixture, coagulating the latex, delivering the resultant composition in gel form in a broad flat stream, conveying said stream away from the point of delivery, and during such conveyance subjecting the material to lateral oscillation of diminishing amplitude, simultaneously kneading the material and subjecting it to progressively increased suction to effect a partial separation of the water, then while further subjecting the material to progressively increasing suction applying surface heat and at the same time applying progressively increasing smoothing and condensing pressure, then applying diathermic heat to effect further drying, and then abrading the upper face of the conveyed sheet to a smooth finish.

5. In a method of making a sheeted leather substitute material, the procedure which comprises preparing a fibre-water mixture in which at least ninety-six percent of the fibre content consists of leather fibres, mixing therewith a latex solution in such relative quantities that the ratio of solid rubber to leather fibre lies within the range of fifteen to seventy-five on the one hand and thirty to sixty on the other to form a composite mixture, coagulating the latex, delivering the resultant composition in gel form in a broad flat stream, conveying said stream away from the point of delivery, and during such conveyance subjecting the material to lateral oscillation of diminishing amplitude, simultaneously kneading the material and subjecting it to progressively increased suction to effect a partial separation of the water, then while further subjecting the stream to progressively increasing suction applying surface heat and at the same time applying progressively increasing smoothing and condensing pressure, then applying diathermic heat to effect further drying, abrading the upper surface of the conveyed sheet to provide a smooth finish and to equalize the sheet thickness, and surface finishing the abraded face of the conveyed sheet.

6. In a machine for producing a sheeted leather substitute material, the combination with means for producing and delivering a gel stream composed largely of water but also including latex and suspended leather fibres, a suction unit including a travelling wire screen for receiving the material, means for driving the screen in a direction to convey the delivered material away from said delivering means, a suction box disposed beneath the active stretch of said screen, a series of parallel suction rollers disposed within said box, said rollers having screed ribs for kneading the material and interlacing it, and means rotating the rollers first in one direction and then in the other but chiefly in a direction counter to the direction in which the active stretch of the wire screen is driven.

7. In a machine for producing a sheeted leather substitute material, the combination with means for producing and delivering a gel stream composed largely of water but also including latex and suspended leather fibres, a suction unit including a travelling wire screen for receiving the material, means for driving the screen in a direction to convey the delivered material away from said delivering means, a suction box disposed beneath the active stretch of said screen, a series of parallel suction rollers disposed within said box, said rollers having right hand and left hand convolvulous screed ribs for kneading the material and interlacing the fibres, means supporting the unit with capacity for lateral oscillation about a vertical axis located near its discharge end, and means for imparting such lateral oscillation to the unit, whereby the material is simultaneously subjected to lateral "shake," screeding and suction to remove an important part of the water content of the material.

8. In a machine for producing a sheeted leather substitute material, the combination with means for producing and delivering a gel stream composed largely of water but also including latex and suspended leather fibres, a suction unit including a travelling wire screen for receiving the material, means for driving the screen in a direction to convey the delivered material away from said delivering means, a suction box disposed beneath the active stretch of said screen, a series of parallel suction rollers disposed within said box, said rollers having screed ribs for kneading the material and interlacing it, means rotating the rollers first in one direction and then in the other but chiefly in a direction counter to the direction in which the active stretch of wire screen is driven, means supporting the unit with capacity for lateral oscillation about a vertical axis located near its discharge end, and means for imparting such lateral oscillation to the unit whereby the material is simultaneously subjected to lateral "shake," screeding and suction to remove an important part of the water content of the material.

9. In a machine for producing a sheeted leather substitute material, the combination with means for producing and delivering a gel stream composed largely of water but also including latex and suspended leather fibres, a suction unit including a travelling wire screen for receiving the material, means for driving the screen in a direction to convey the delivered material away from said delivering means, a suction box disposed beneath the active stretch of said screen, a series of parallel suction rollers disposed within said box, said rollers having screed ribs for kneading the material and interlacing it, means rotating the rollers first in one direction and then in the other but chiefly in a direction counter to the direction in which the active stretch of wire screen is driven, means supporting the unit with capacity for lateral oscillation about a vertical axis located near its discharge end, means for imparting such lateral oscillation to the unit, whereby the material is simultaneously subjected to lateral "shake," screeding and suction to remove an important part of the water content of the material, and means for causing increasing suction power to be applied to the successive suction rollers in the order in which they are encountered by the material.

10. In a machine for converting a stream of gel which consists chiefly of water, rubber and leather fibers into a coherent sheet, a suction unit comprising a travelling wire screen for receiving the material, means for driving the screen in a material advancing direction, a suction box beneath the screen, a series of parallel suction rollers within the box, said rollers including screeding projections for kneading the material through the wire screen, impositive driving means acting to drive the rollers backward with respect to the direction of wire screen advance, and supervening drive means comprising a ratchet fast with each roller, a pawl cooperative therewith, and means for positively reciprocating the pawl to cause the ratchet intermittently to turn the rollers in a forward direction.

11. In a machine for converting a stream of gel which consists chiefly of water, rubber and leather fibres into a coherent sheet, a suction unit comprising a travelling wire screen for receiving the material, means for driving the screen in a material advancing direction, a suction box beneath the screen, a series of parallel suction rollers within the box, said rollers including screeding projections for kneading the material through the wire screen, impositive driving means acting to drive the rollers backward with respect to the direction of wire screen advance, and supervening drive means comprising a ratchet fast with each roller, a pawl cooperative therewith, means for positively reciprocating the pawl to cause the ratchet intermittently to turn the rollers in a forward direction, a shield overlying the ratchet in the path traversed by the pawl, and means for adjusting the shield circumferentially of the ratchet to adjust the range of movement through which the pawl may engage and drive the ratchet.

12. In a machine for converting a stream of gel material consisting chiefly of water, leather fibres and rubber into a coherent sheet, in combination, a first suction unit comprising means for simultaneously shaking the gel material from side to side, kneading the material, and subjecting it to progressively increasing suction to eliminate an important part of the water, and a second suction unit following the first and including means for subjecting the material to surface heating, to progressively increasing pressure, and to progressively increasing suction which is higher stage for stage than the suction in the first unit.

13. In a machine for producing from a gel a sheeted leather substitute material consisting principally of leather and rubber, a suction unit comprising a screen wire conveyor, means for driving the conveyor, a suction box beneath the active stretch of the wire conveyor, a series of parallel suction rollers within the suction box, means for applying progressively increased suction to the rollers from the first to the last thereof, and a series of opposed pressure rollers above the wire conveyor.

14. In a machine for producing from a gel a sheeted leather substitute material consisting principally of leather and rubber, a suction unit comprising a screen wire conveyor, means for driving the conveyor, a suction box beneath the active stretch of the wire conveyor, a series of parallel suction rollers within the suction box, means for applying progressively increased suction to the rollers from the first to the last thereof, a series of opposed pressure rollers above the wire conveyor, and means causing increasing pressure to be applied by the opposed pairs of upper and lower rollers from the first pair to the last.

15. In a machine for producing from a gel a sheeted leather substitute material consisting principally of leather and rubber, a suction unit comprising a screen wire conveyor, means for driving the conveyor, a suction box beneath the active stretch of the wire conveyor, a series of parallel suction rollers within the suction box, means for applying progressively increased suction to the rollers from the first to the last thereof, a series of opposed pressure rollers above the wire conveyor, means causing increasing pressure to be applied by the opposed pairs of upper and lower rollers from the first pair to the last, and means for heating a portion at least of said rollers.

16. In a machine for producing from a gel a sheeted leather substitute material consisting principally of leather and rubber, a suction unit comprising a screen wire conveyor, means for driving the conveyor, a suction box beneath the active stretch of the wire conveyor, a series of parallel suction rollers within the suction box, means for applying progressively increased suction to the rollers from the first to the last thereof, a series of opposed pressure rollers above the wire conveyor, and adjustable means for increasing or diminishing the total pressure applied by the opposed rollers and for causing increasing pressure to be applied by the opposed pairs of upper and lower rollers from the first pair to the last.

17. In a machine for producing from a gel a sheeted leather substitute material consisting principally of leather and rubber, a suction unit comprising a screen wire conveyor, means for driving the conveyor, a suction box beneath the active stretch of the wire conveyor, a series of parallel suction rollers within the suction box, means for applying progressively increased suction to the rollers from the first to the last thereof, a series of opposed pressure rollers above the wire conveyor, means causing increasing pressure to be applied by the opposed pairs of upper and lower rollers from the first pair to the last, and means for driving all the upper and lower rollers at equal rotary speeds, the rollers of the upper and lower sets being of increasing diameters from the first to the last roller of each set.

18. In a machine for converting a stream of gel material which consists principally of water, leather fibres and rubber to a coherent sheet, a suction unit, comprising, in combination, a wire screen conveyor, means for driving the conveyor to advance the gel material, a series of suction boxes and screed rollers arranged in alternation beneath the active stretch of the conveyor, and means for applying increasing suction to the suction boxes from the first to the last thereof.

19. In a machine for converting a stream of gel material which consists principally of water, leather fibres and rubber to a coherent sheet, a suction unit, comprising, in combination, a wire screen conveyor, means for driving the conveyor to advance the gel material, a series of suction boxes and screed rollers arranged in alternation beneath the active stretch of the conveyor, and means for driving the screed rollers in opposite directions, but chiefly in a direction opposite to that in which the active stretch of the conveyor travels.

References Cited in the file of this patent

UNITED STATES PATENTS

| | | |
|---|---|---|
| 1,777,838 | Ferretti | Oct. 7, 1930 |
| 1,802,407 | Danninger et al. | Apr. 28, 1931 |
| 1,816,754 | White | July 28, 1931 |
| 1,827,356 | Ferretti | Oct. 13, 1931 |
| 1,889,642 | Davis | Nov. 29, 1932 |
| 1,945,173 | Woodruff | Jan. 30, 1934 |
| 1,956,179 | Schur | Apr. 24, 1934 |
| 1,961,916 | Sherman | June 5, 1934 |
| 1,967,967 | Nickowitz | July 24, 1934 |
| 1,993,276 | Murphy et al. | Mar. 5, 1935 |
| 2,040,511 | Bleyenheuft | May 12, 1936 |
| 2,047,136 | Doyle | July 7, 1936 |
| 2,112,517 | Cable | Mar. 29, 1938 |
| 2,140,189 | Mason | Dec. 13, 1938 |
| 2,217,691 | Mason | Oct. 15, 1940 |
| 2,226,871 | Nicholas | Dec. 31, 1940 |
| 2,249,959 | Johannessen | July 22, 1941 |
| 2,330,084 | Scott | Sept. 21, 1943 |
| 2,336,497 | Milne | Dec. 14, 1943 |
| 2,362,450 | Chappel | Nov. 14, 1944 |
| 2,441,169 | Roman | May 11, 1948 |
| 2,601,671 | Wilson et al. | June 24, 1952 |

FOREIGN PATENTS

| | | |
|---|---|---|
| 821,810 | France | Sept. 6, 1937 |
| 15,253 | Great Britain | Apr. 23, 1908 |
| 360,968 | Great Britain | Nov. 16, 1931 |
| 522,880 | Great Britain | June 28, 1940 |